US012589619B2

(12) United States Patent
Blondelet et al.

(10) Patent No.: US 12,589,619 B2
(45) Date of Patent: Mar. 31, 2026

(54) SYSTEM FOR MEASURING THE INTERNAL TEMPERATURE OF A RUNNING TIRE

(71) Applicant: COMPAGNIE GENERALE DES ETABLISSEMENTS MICHELIN, Clermont-Ferrand (FR)

(72) Inventors: Michel Blondelet, Clermont-Ferrand (FR); Nicolas Besnard, Clermont-Ferrand (FR); Sylvie Richez, Clermont-Ferrand (FR); Gregory Servaud, Varennes-Vauzelles (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 221 days.

(21) Appl. No.: 18/277,784

(22) PCT Filed: Feb. 14, 2022

(86) PCT No.: PCT/FR2022/050258
§ 371 (c)(1),
(2) Date: Aug. 18, 2023

(87) PCT Pub. No.: WO2022/180319
PCT Pub. Date: Sep. 1, 2022

(65) Prior Publication Data
US 2024/0051358 A1 Feb. 15, 2024

(30) Foreign Application Priority Data
Feb. 25, 2021 (FR) ........................................ 2101821

(51) Int. Cl.
*B60C 23/20* (2006.01)
*B29D 30/00* (2006.01)
*B60C 19/00* (2006.01)

(52) U.S. Cl.
CPC .......... *B60C 23/20* (2013.01); *B29D 30/0061* (2013.01); *B29D 2030/0083* (2013.01); *B60C 2019/004* (2013.01)

(58) Field of Classification Search
None
See application file for complete search history.

(56) References Cited

U.S. PATENT DOCUMENTS

| | | |
|---|---|---|
| 5,731,754 A | 3/1998 | Lee, Jr. et al. |
| 7,050,017 B2 | 5/2006 | King et al. |

(Continued)

FOREIGN PATENT DOCUMENTS

| | | |
|---|---|---|
| CN | 101068693 A | 11/2007 |
| CN | 102687180 A | 9/2012 |

(Continued)

OTHER PUBLICATIONS

International Search Report dated May 30, 2022, in corresponding PCT/FR2022/050258 (5 pages).

*Primary Examiner* — Peter J Macchiarolo
*Assistant Examiner* — Jermaine L Jenkins
(74) *Attorney, Agent, or Firm* — VENABLE LLP

(57) ABSTRACT

A system for measuring the temperature inside a rubber compound of a tire (20) when it is running, comprises at least one sensor (10) fitted with a microprocessor, radio transmission means, a temperature measuring probe, and power supply means such that: the sensor (10) is inserted in an area of the tire (20) originating from a manufacturing process, the area being identified on the basis of predefined selection criteria; the sensor (10) is embedded in a hermetically sealed volume formed inside a rubber compound of the tire (20) originating from a manufacturing process; and the system comprises means for keeping the sensor in a fixed position while the tire (20) is running.

11 Claims, 2 Drawing Sheets

(56)                     References Cited

U.S. PATENT DOCUMENTS

| | | | |
|---|---|---|---|
| 8,162,534 | B2 | 4/2012 | Fagot-Revurat et al. |
| 8,640,535 | B2 | 2/2014 | Weston |
| 9,434,409 | B2 | 9/2016 | Singh |
| 10,618,236 | B2 * | 4/2020 | Custodero ........... B60C 23/0493 |
| 10,836,223 | B1 | 11/2020 | Schessler et al. |
| 10,953,709 | B2 * | 3/2021 | Bickard ................ B60C 23/041 |
| 11,167,604 | B2 | 11/2021 | Delacroix |
| 11,613,091 | B2 | 3/2023 | Kukkonen et al. |
| 2003/0021330 | A1 | 1/2003 | Aubel et al. |
| 2005/0057346 | A1 | 3/2005 | Ogawa |
| 2005/0093761 | A1 | 5/2005 | King et al. |
| 2008/0089385 | A1 | 4/2008 | Fagot-Revurat et al. |
| 2010/0319446 | A1 | 12/2010 | Coue |
| 2012/0300809 | A1 | 11/2012 | Weston |
| 2015/0284021 | A1 | 10/2015 | Singh |
| 2016/0076974 | A1 | 3/2016 | Abe |
| 2017/0282657 | A1 | 10/2017 | Gyanani |
| 2019/0315165 | A1 | 10/2019 | Delacroix |
| 2021/0245462 | A1 | 8/2021 | Kukkonen et al. |
| 2022/0219493 | A1 * | 7/2022 | Sauerwald .............. B60C 23/20 |
| 2024/0133750 | A1 | 4/2024 | Blondelet et al. |

FOREIGN PATENT DOCUMENTS

| | | | |
|---|---|---|---|
| CN | 106273113 | A | 1/2017 |
| CN | 112236317 | A | 1/2021 |
| DE | 102019206265 | A1 | 11/2020 |
| EP | 2927074 | A1 | 10/2015 |
| EP | 2988109 | A1 | 2/2016 |
| EP | 3578392 | B1 | 7/2020 |
| FR | 3060463 | A1 | 6/2018 |
| WO | 2004/016454 | A1 | 2/2004 |
| WO | 2008/046766 | A1 | 4/2008 |
| WO | 2019/220064 | A2 | 11/2019 |

* cited by examiner

SYSTEM FOR MEASURING THE INTERNAL TEMPERATURE OF A RUNNING TIRE

TECHNICAL FIELD

The present invention relates to a system for measuring the temperature inside a rubber compound of a tyre under actual running conditions. The tyres that are primarily of interest are fitted to construction plant vehicles for mining.

For example, such vehicles (dumpers or dump trucks) are used in opencast mines for transporting materials extracted from quarries with loads that can reach a mass of over 350 tonnes. The tyres are sized accordingly, and can each weigh around 5 tonnes.

By way of illustration, a tyre to which the invention relates has a standardized designation according to ETRTO (European Tyre and Rim Technical Organisation) of the 59/80 R 63 type, with an inflation pressure of 650 kPa. The outside diameter of the tyre mounted on a rim and inflated to 650 kPa may measure more than 4 metres. Other diameters of 49 to 57 inches can also be found on these vehicles.

Definitions

By convention, in a frame of reference (O, t, y, r), the centre O of which coincides with the centre of the tyre, the circumferential direction (O, t), axial direction (O, y) and radial direction (O, r) refer to a direction tangential to the tread surface of the tyre in the direction of rotation, to a direction parallel to the axis of rotation of the tyre, and to a direction orthogonal to the axis of rotation of the tyre, respectively.

Radially inner and radially outer mean closer to and further away from the axis of rotation of the tyre, respectively.

Axially inner and axially outer mean closer to and further away from the equatorial plane of the tyre, respectively, the equatorial plane of the tyre being the plane that passes through the middle of the tread of the tyre and is perpendicular to the axis of rotation of the tyre.

An elastomeric compound, or rubber compound, is understood to be an elastomeric material obtained by blending its various constituents. An elastomeric compound conventionally comprises an elastomer matrix comprising at least one diene elastomer of the natural or synthetic rubber type, at least one reinforcing filler of the carbon black type and/or of the silica type, a crosslinking system that is usually sulphur-based, and protective agents.

An elastomeric compound can be mechanically characterized, in particular after curing, by its dynamic properties, such as a dynamic shear modulus $G^*=(G'^2+G''^2)^{1/2}$, where $G'$ is the elastic shear modulus and $G''$ is the viscous shear modulus, and a dynamic loss tan $\delta=G''/G'$. The dynamic shear modulus $G^*$ and the dynamic loss tan $\delta$ are measured on a Metravib VA4000 viscosity analyser according to the standard ASTM D 5992-96. The response of a sample of vulcanized elastomeric compound in the form of a cylindrical test specimen with a thickness of 4 mm and a cross section of 400 mm$^2$, subjected to a simple alternating sinusoidal shear stress at a frequency of 10 Hz, with a strain amplitude sweep from 0.1% to 50% (outward cycle) and then from 50% to 0.1% (return cycle), at a given temperature, for example equal to 60° C., is recorded. These dynamic properties are thus measured for a frequency equal to 10 Hz, a strain equal to 50% of the peak-to-peak strain amplitude, and a temperature that can be equal to 60° C. or 100° C.

An elastomeric compound can also be characterized by static mechanical properties. The tensile tests make it possible to determine the elasticity stresses and the properties at break. Unless indicated otherwise, they are carried out in accordance with the French standard NF T 46-002 of September 1988. The secant moduli known as "nominal" secant moduli (or apparent stresses, in MPa) at 10% elongation (denoted "MA10") and 100% elongation ("MA100") are measured in second elongation (i.e. after an accommodation cycle). All these tensile measurements are carried out under standard temperature (23±2° C.) and hygrometry (50±5% relative humidity) conditions, according to the French standard NF T 40-101 (December 1979). The stresses at break (in MPa) and the elongations at break (in %) are also measured, at a temperature of 23° C.

PRIOR ART

Generally, a tyre comprises a tread intended to come into contact with the ground via a tread surface, the two axial ends of which are connected via two sidewalls to two beads that provide the mechanical connection between the tyre and the rim on which it is intended to be mounted.

A radial tyre further comprises a reinforcement made up of a crown reinforcement radially on the inside of the tread and of a carcass reinforcement radially on the inside of the crown reinforcement.

The carcass reinforcement of a radial tyre for a heavy-duty vehicle of construction plant type usually comprises at least one carcass layer comprising generally metal reinforcers that are coated in an elastomer compound that is obtained by blending and is known as a coating compound. A carcass layer comprises a main part that joins the two beads together and is generally wound, in each bead, from the inside of the tyre to the outside, around a usually metal circumferential reinforcing element known as a bead wire so as to form a turn-up. The metal reinforcers of a carcass layer are substantially mutually parallel and form an angle of between 85° and 95° with the circumferential direction.

The crown reinforcement of a radial tyre for a heavy-duty vehicle of construction plant type comprises a superposition of circumferentially extending crown layers, radially on the outside of the carcass reinforcement. Each crown layer is made up of generally metal reinforcers that are mutually parallel and coated in a rubber compound known as a coating compound.

Among the crown layers, a distinction is usually made between the protective layers, which make up the protective reinforcement and are radially outermost, and the working layers, which make up the working reinforcement and are radially comprised between the protective reinforcement and the carcass reinforcement.

The protective reinforcement, which comprises at least one protective layer, essentially protects the working layers from mechanical or physicochemical attacks, which are likely to spread through the tread radially towards the inside of the tyre.

The protective reinforcement of tyres of GC type, such as those described above, usually comprises two radially superposed protective layers formed of elastic metal reinforcers that are mutually parallel in each layer and are crossed from one layer to the next, forming angles at least equal to 10° and at most equal to 35° with the circumferential direction.

The working reinforcement, comprising at least two working layers, has the function of belting the tyre and conferring stiffness and road holding on it. It absorbs both mechanical inflation stresses, which are generated by the tyre inflation pressure and transmitted by the carcass reinforcement, and mechanical stresses caused by running, which are generated as the tyre runs over the ground and are transmitted by the tread. It is also intended to withstand oxidation and impacts and puncturing, notably by virtue of its intrinsic design and that of the protective reinforcement.

The working reinforcement usually comprises two radially superposed working layers formed of inextensible metal reinforcers that are mutually parallel in each layer and are crossed from one layer to the next, forming angles at most equal to 60°, and preferably at least equal to 15° and at most equal to 45°, with the circumferential direction. Here, inextensible metal reinforcers are understood to mean a metal reinforcer characterized by an elongation, under a tensile force equal to 10% of the force at break, at most equal to 0.2%.

In order to reduce the mechanical inflation stresses that are transmitted to the working reinforcement, it is known practice to dispose a hoop reinforcement radially on the outside of the carcass reinforcement. The hoop reinforcement, the function of which is to at least partially absorb the mechanical inflation stresses, improves the endurance of the crown reinforcement by stiffening the crown reinforcement. The hoop reinforcement may be positioned radially on the inside of the working reinforcement, between the two working layers of the working reinforcement, or radially on the outside of the working reinforcement.

The hoop reinforcement usually comprises two radially superposed hooping layers formed of metal reinforcers that are mutually parallel in each layer and are crossed from one layer to the next, forming angles at most equal to 10° with the circumferential direction.

Mining consists in extracting minerals, that is to say rocks from the Earth's crust containing useful minerals or metals in a proportion high enough to justify their exploitation.

The transporting step in mining is essential for its economic viability. The vehicles (dumpers or dump trucks) generally operate without stopping in order to obtain maximum productivity by moving the greatest volume of rubble to be processed by mineral processing operations.

The management of the tyres of the vehicle fleet consists in monitoring the inflation pressure, the temperature, and the wear using a predictive maintenance approach, so as to anticipate malfunctions linked to the tyres and thus to avoid stoppage of the vehicle in order to maximize its period of use.

As a result, one of the expectations of clients in the mining sector is the productivity of the exploitation, which should not be affected by defects in the product, and therefore the period of use of the tyres, which should be as long as possible. It is necessary to avoid stoppages of the vehicles and consequently there is a need to develop preventative maintenance for controlled use of the tyres.

The monitoring of the temperature of the tyres in real time is an essential step for managing the vehicle fleet. The temperature is directly linked to the endurance and the service life of the tyres.

It will be noted that the documents U.S. Pat. No. 5,731,754A, US2017282657A1, U.S. Ser. No. 10/836,223B1, WO2004016454A1 and US2005057346A1 propose solutions for accessing the measurement of the temperature in the compounds of the tyre.

Document FR3060463 proposes a method for estimating the harshness of the use conditions of a tyre mounted on a vehicle. One step of this method involves evaluating the temperature inside a compound, but this evaluation is based on a mathematical model which can be complex to implement in certain cases.

The application WO 2008046766A1 discloses a method for indicating the ageing experienced by a tyre, wherein a temperature is measured locally at least at one point on the tyre. This method requires the installation of a temperature sensor directly in the tyre, which can give rise to additional costs.

There is still a need for accessing the temperatures inside the rubber compounds of a tyre when it is running, in a straightforward and nondestructive way. It is necessary to be able to locate the areas of the tyre that are most sensitive to heat in order to measure the temperature in real time. To do this, the running conditions such as the nature of the ground, whether it is stony, muddy or tarmacked, the internal structure of the tyre, or else the topography of the mine need to be taken into consideration.

SUMMARY OF THE INVENTION

The objective of the invention is to propose a system for measuring the temperature inside rubber compounds on the basis of the conditions listed above.

The solution proposed by the invention consists in a system for measuring the temperature inside a rubber compound of a tyre when it is running, comprising at least one sensor fitted with a microprocessor, radio transmission means, a temperature measuring probe, and power supply means such that:

the sensor is inserted in an area of the tyre originating from a manufacturing process, said area being identified on the basis of predefined selection criteria;

said sensor is embedded in a hermetically sealed volume formed inside a rubber compound of the tyre originating from a manufacturing process;

the system comprises means for keeping the sensor in a fixed position while the tyre is running.

A construction plant tyre comprises a tread intended to be in contact with the ground. The nature of the ground varies depending on the use conditions, which are sometimes muddy, stony or tarmacked. To adapt to the various soil types, the tread has cuts, notably transverse or circumferential cuts, so as to define blocks of rubber compound that are intended to provide sufficient grip irrespective of the nature of the ground to transmit the torque of the vehicle. The blocks of rubber compound of the tread also have sipes for forming flexibility-enhancing sipe blades with a view to promoting grip on snowy ground, for example.

As recalled above, the internal structure of these tyres has multiple crown layers. Each crown layer comprises reinforcers coated in rubber compounds. It is known that the temperature reaches high levels at the end of these crown layers owing to the severity of the strain in these locations.

The selection criteria for the sensor insertion area can be for example to choose blocks of rubber compound of the tread, or else the ends of crown layers. Additional criteria can be defined depending on the running conditions such as the nature of the ground, whether it is stony, muddy or tarmacked, the internal structure of the tyre, or else the topography of the mine.

Within the meaning of the invention, a tyre originating from a manufacturing process means that the invention relates to an already manufactured tyre and that the insertion of the sensor does not interfere with the tyre manufacturing process. The sensors can be inserted before or after the tyre has been mounted on the axle of the vehicle.

The sensor is embedded in a hermetically sealed volume, which means that a location has been created for this and then hermetically filled in after the insertion of the sensor.

One of the features of the invention is to directly access the temperature inside the selected rubber compound. The sensor, provided with radio transmission means, is not connected to the outside, this making it possible to measure the temperature of the tyre while it is running without stopping the vehicle. This way of measuring does not affect the productivity of the mining, since the vehicle is not stopped to take the temperature measurements.

The radio transmission means comprise, for each sensor, an active transmitter which comprises an electronic chip that stores the data and an antenna for operating in a given frequency band. At regular intervals, the active transmitter communicates the identifier of the sensor and the temperature value to a receiver located in the vehicle. The microprocessor of the sensor averages the temperature over the time interval between two transmissions. The transmitter, like the microprocessor, consumes the energy supplied by the battery.

The transmission means are unidirectional and operate with a low energy consumption, mainly owing to the radio transmission. Such a design of the transmission means makes it possible to make the sensor as small as possible and to minimize the costs. It also affords good resistance and good durability in spite of the very demanding environment in which the tyres of construction plant vehicles run.

Another feature of the invention is that the holding means make it possible to keep the sensor in a fixed position without movements and without vibrations by way of the surrounding environment so as to obtain a measurement of satisfactory quality. These holding means have various natures, such as chemical in the case of adhesives or mechanical in the case of a clamping device in line with the size of the components of the device.

The measurements obtained with the sensor have been compared with conventional temperature evaluation results, such as using thermocouples, and confirmed both the quality and the precision of the values obtained with the invention.

Preferably, a layer of cold-vulcanized adhesive is laid between the outer surface of the sensor and the rubber compound of the cavity.

A cold-vulcanizing adhesive is understood to mean an adhesive which causes a chemical reaction consisting in incorporating a vulcanizing agent, usually sulfur, with a crude elastomer so as to form bridges between the molecular chains. This operation notably makes the material less plastic but more elastic.

The inventors have observed that the use of such an adhesive within the context of the invention makes it possible to have high-quality adhesive bonding between the sensor and the rubber compound of the cavity.

A preferred example of adhesive is that produced by Tip Top and sold under the "blue cement" name of adhesive.

From a practical perspective, the outer surface of the tyre is perforated at the desired installation position of the sensor to access the selected area. By way of example, the sensor can be positioned at the end of the protective crown layers at the location where the radial thickness of the tyre is at its highest. After cleaning the cavity that is made, the adhesive of "blue cement" type is used to adhesively bond the sensor to the bottom and on the walls of the cavity. For this, an adhesive thickness of at least two millimetres is applied to the entire outer surface of the sensor. For the type of adhesive used, the setting time of the adhesive is at least twenty four hours for this use.

The layer of adhesive advantageously serves as lubricant to make it easier to introduce the sensor into the layer of rubber compound of the tyre.

This is because, once the cavity has been hollowed out in the tyre at the desired location, it is necessary to be able to introduce the sensor there so that it makes a clamping fit with the wall. To make this introduction easier, the adhesive is selected so as to provide both adhesive and lubricant functions.

Advantageously according to the invention, the sensor has at least part of the fixing means for holding it in a fixed position. The outer surface of the sensor can thus be grooved to promote the fixation of the sensor in the rubber compound of the tyre of which the temperature is measured. This is because the grooves define irregularities in the outer surface of the sensor to make it easier to anchor it in the rubber compound.

In one embodiment, the sensor occupies a cylindrical volume of which the length of the cylinder is less than or equal to the radial thickness of the tread measured in an equatorial plane of the tyre. Advantageously, in one embodiment variant, the sensor occupies a cylindrical volume of which the length of the cylinder is less than or equal to 60 mm, and wherein the diameter of the cylinder is less than or equal to 25 mm.

Preferably, the length of the cylinder is less than or equal to 45 mm. The risks of the cylinder being impaired, for example by bending, are minimized with such a length.

Also preferably, the diameter of the cylinder is less than or equal to 17 mm.

In this embodiment, the cavity is advantageously hollowed out using a drill fitted with a drill bit. The length and the diameter of the cavity are defined at sufficiently low values in relative terms with respect to the size of the tyre so as to be able to reuse the tyre without making significant repairs after the sensor has been extracted.

A particular, very advantageous case of this embodiment corresponds to the situation in which the sensor of cylindrical geometry is received in a cylindrical cavity inside the rubber compound of which the diameter of said cylindrical cavity is less than or equal to that of the sensor.

The introduction of the sensor into the cavity is done with natural clamping when the sensor and the cavity have the same diameter.

When the temperature is to be measured close to the crown layers, the depth of the cavity is significantly greater than the length of the sensor. This is because the radial thickness of the tread of the tyres in question here is much greater than the length of the sensor. As a result, after the sensor has been fixed to the bottom and on the walls of the cavity, an empty volume directed towards the outside of the tyre remains, it being necessary to fill in this empty volume in order to protect the sensor. Preferably, the cavity containing the sensor is closed by a stopper made of the same rubber compound as that containing the sensor.

The sensor enclosed within a rubber compound undergoes periodic mechanical and thermal stress loadings owing to the rotation of the tyre. The sensor groups together its constituent components, such as a thermocouple, a microprocessor, a radio transmitter and a battery, on an electronic circuit board. In order to preserve the integrity of this electronic circuit board even better, advantageously said electronic circuit board is coated in an encapsulating resin.

The encapsulating resin is preferably based on epoxy to better ensure the protection of the electronic circuit board. For additional mechanical protection, the sensor is more advantageously moulded from a flexible material of which the dynamic shear stiffness modulus is less than or equal to one quarter of the dynamic shear stiffness modulus of the compound of which the temperature is measured. In this way, the strains undergone by the portion of rubber compound containing the sensor will mainly affect this protective flexible material layer.

As mentioned above, the sensor which has the radio transmission means operates remotely when the tyre is being used in the running state. In one embodiment variant of the invention, the activation of the sensor consists in breaking a wire connecting two electrodes of the sensor. The activation of the sensor causes the temperature measuring operations to start and the transmission of the temperature values and of the identifier of the sensor to start and be repeated.

In one embodiment variant of the invention, the tyre contains an identification tag.

According to this embodiment variant, the sensor is fitted with an active electronic module for measuring and transferring physical parameters of the tyre, and said sensor has:
  i. means for measuring different physical parameters to the temperature of the tyre;
  ii. means for reading the identification tag of the tyre;
  iii. a data transmission module for transmitting the physical data received from the sensor, including the identification of the tyre, to a remote receiver.

In this embodiment, the sensor is fitted with multiple physical parameter measuring means, such as a piezoelectric measuring device, or else a pressure detector. The tyre and the sensor each have a passive identification tag. According to this embodiment, advantageously, it is provided that the passive identification tag of the tyre may be an independent RFID tag of the sensor.

This embodiment of the invention makes it possible to manage the monitoring of the tyres which consists in reliably knowing, at all times, their location, that of the tyres and that of the sensor for measuring the associated physical parameters.

DESCRIPTION OF THE FIGURES

The invention will be better understood on reading the following description, which is given purely by way of nonlimiting example and with reference to FIGS. 1-A, 1-B, 2, 3-A and 3-B), in which.

DETAILED DESCRIPTION

Figure 1:
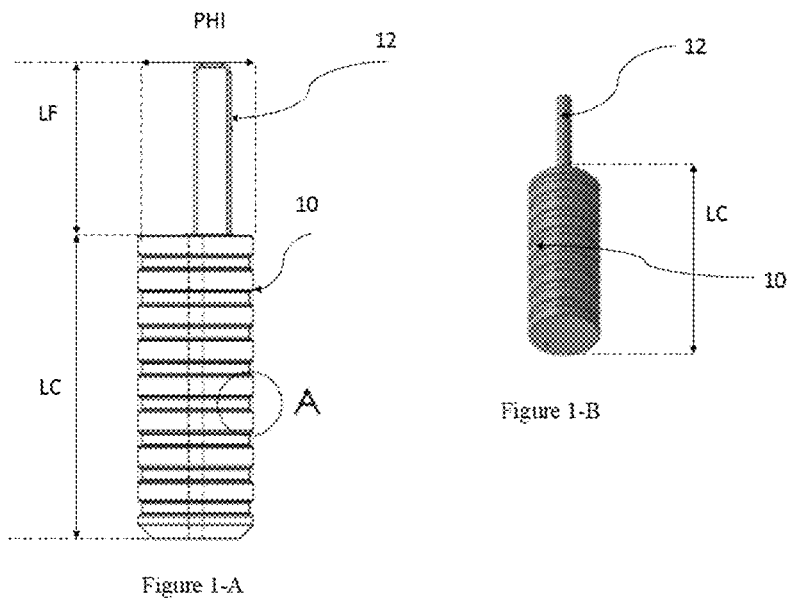
FIGS. 1-A and 1-B depict views of the sensor of the temperature measuring system proposed by the invention.

FIG. 1-A shows the sensor 10 which has a geometry of cylindrical shape, with a length LC and a diameter PHI, having the activation wire 12 which has a length LF. In FIG. 1-B, a volume view of the sensor 10 can be seen. The sensor 10 is intended to be inserted into the tyre 20 of FIG. 2. Reference A in FIG. 1-A shows the grooves which are a succession of recesses and bosses in the longest direction of the sensor, and said grooves are intended to make it easier to anchor the sensor in a rubber compound of the tyre 20.

The tyre 20 is mounted on a vehicle fitted with a device for communicating with said sensor.

The reading means positioned in the vehicle store the data in a database, which is accessible by a remote server. The sensor 10 comprises an electronic circuit board with a circuit connecting the components, such as a temperature measuring probe, a microprocessor, a radio transmitter, a transponder and a battery.

Upon activation of the sensor, before it is inserted into the rubber compound, the activation wire 12 is cut at its end in contact with the sensor.

Figure 2:
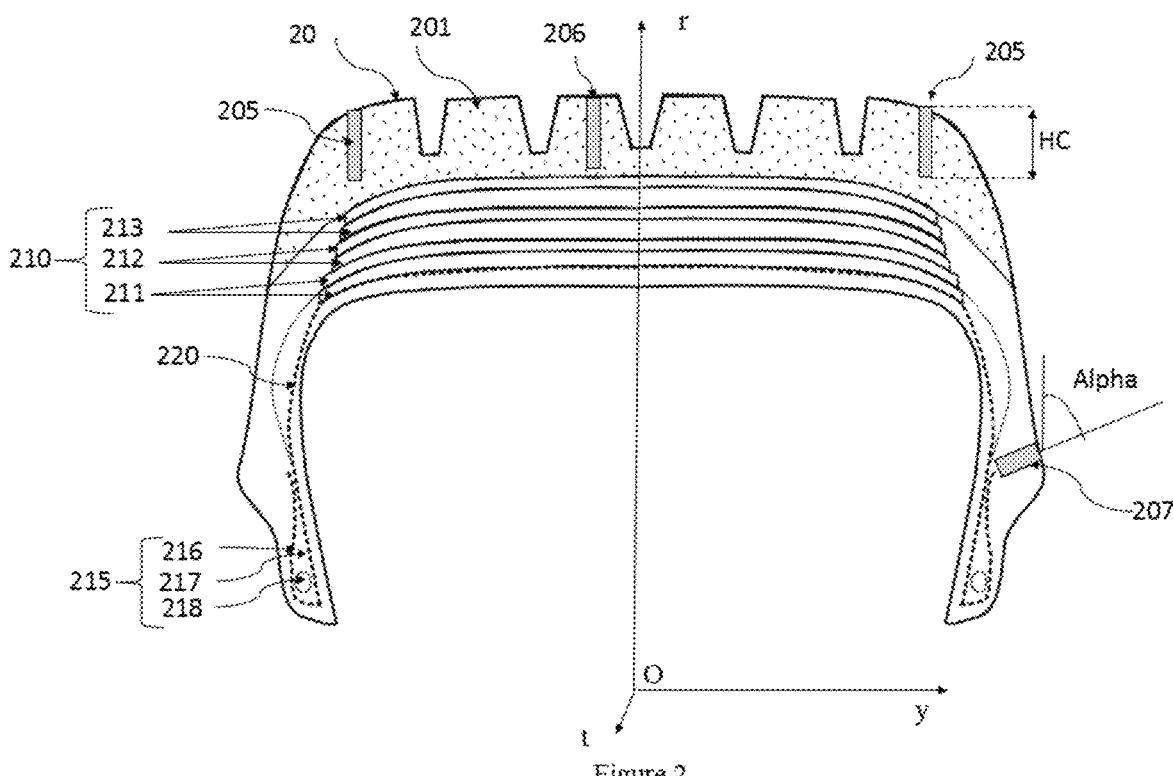
FIG. 2 is a meridian plane (y, r) of the tyre, that is to say a generator plane of the tyre in three dimensions generated by the rotation of this meridian plane about the axis (O, y) of the cylindrical frame of reference (O, t, y, r) associated with the tyre.

In FIG. 2, the tyre 20 has a tread 201 which is represented by the radially outermost volume, comprising black dots, of the tyre. The crown reinforcement 210 is formed of a working reinforcement 211, a protective reinforcement 212 and a hoop reinforcement 213, which are outwardly radially superposed. Each reinforcement comprises two layers formed of reinforcers coated in rubber compounds. Lastly, in this example the crown reinforcement comprises six radially superposed crown layers, each formed of reinforcers coated in rubber compounds. Radially on the inside of the crown reinforcement 210 is the carcass reinforcement 220, which comprises at least one carcass layer formed of a main strand 217 which surrounds a bead wire 218 axially from the inside to the outside of the bead and is continued radially outwards by a turn-up strand 216. The reinforcers of the carcass layer make an angle of approximately 90° with the circumferential direction.

This architecture optimizes the endurance of the tyre to bear the load required, but has the drawback of being sensitive to temperature, which catalyses the tyre cracking and damage phenomena, notably at the ends of the crown layers.

Still in FIG. 2, cavities 205 at the end of the crown layers and cavities 206 in the centre of the tread, which are oriented from the outer periphery of the tyre into the rubber compounds, are hollowed out so as to receive a respective temperature measuring sensor 10. The invention also works with cavities 207 which are positioned radially on the inside. It is possible to visualize the angle Alpha that the drilling direction makes with the radial direction and the depth HC of the cavity. For the cavities 205 and 206, the drilling direction is parallel to the radial direction, and therefore the angle Alpha is zero. In this example, each sensor 10 has a length of 45 mm and a diameter of 17 mm, so as to occupy a relatively small volume with regard to the size of the tyre. This is because, at the end of the measurements, it is necessary to be able to extract each sensor without damaging the tyre.

The invention has been implemented on a tyre of size 59/80 R63 designated by the ETRTO (European Tyre and Rim Technical Organisation) standard which is fitted to a vehicle of dumper truck type. The tyre tested is inflated to 650 kPa.

The front axle of the dumper truck has been fitted with these tyres mentioned above. The load on the front axle is 63 tonnes.

The sensors have been positioned to measure the temperature close to the crown layers at the shoulders in the cavities 205 and in the centre of the tyre in the cavities 206. These areas have been identified as being those most sensitive to temperature by a digital simulation, taking account of the use of the tyres and notably of the mine that is worked. The test is run over 10 days.

The sensor comprises an electronic circuit board fitted with a temperature measuring probe and a radio transmitter, which can be interrogated by a reader positioned in the vehicle. The temperature probe, the radio transmitter and the reader have conventional references that are commercially available. The period of transmission of data from the sensor to the vehicle is five minutes.

Figure 3:
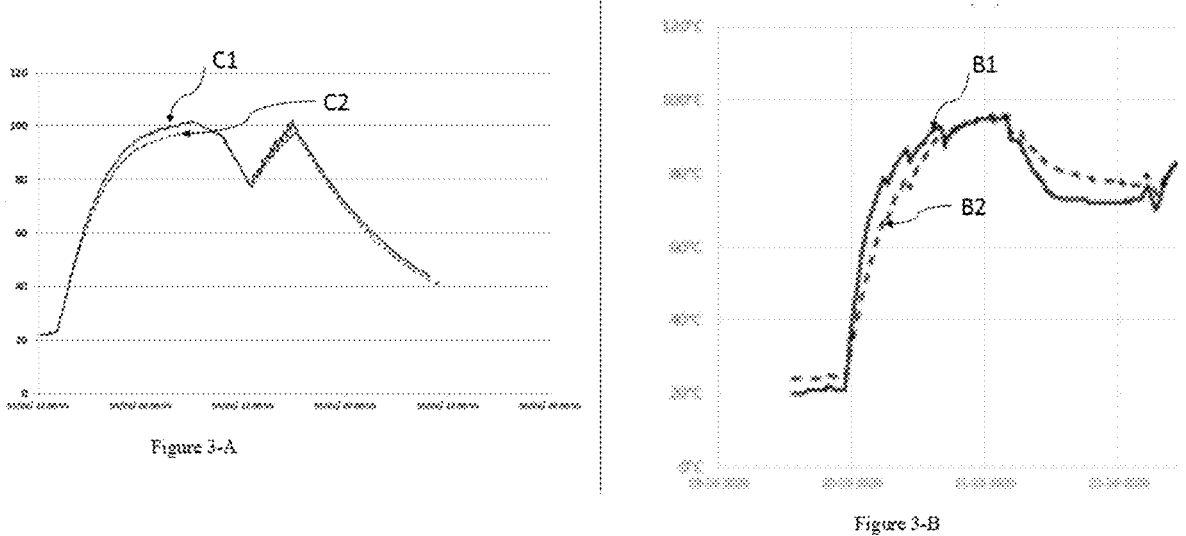
FIGS. 3-A and 3-B depict the curves of temperature measurement results obtained with the means of the invention on a tested tyre size.

In FIG. 3-A, it is possible to see the comparison between the temperature measured by thermocouples (curve C2, which is in dashed line) and the temperature measured by the means of the invention (curve C1, which is in continuous line). This result has been obtained by adding thermocouples to a tyre of the invention to carry out a comparative test under the same stress loading conditions on a suitable machine.

FIG. 3-B shows two curves B1 and B2 which reproduce the evolution of the temperature at the ends of the crown layers (curve B1 in continuous line) and in the centre of the tread (curve B2 in dashed line) to a depth of at least 45 mm while the tyre is running. In FIG. 3-B, the abscissa axis depicts the days of running, and the ordinate axis depicts the temperature.

The invention has the advantage of accessing the temperature level in rubber compounds easily and automatically, to the detriment of the conventional approaches, for example using thermocouples which can have an adverse effect on the productivity of mining. This is because the vehicles are not stopped and human interventions are limited in the temperature measurement method proposed by the invention.

The measuring means of the invention give results that conform to those obtained with traditional means, such as thermocouples. The measurement means, the method for inserting them, the means for keeping the sensors in a fixed position, and the means for communicating the measured temperature values are supported by these results.

A first example of applying the results of the invention is to adapt the use conditions of the tyres in real time depending on the average temperature level. Alert devices can be installed to inform the driver when the temperature reaches an excessive level, and indicate to them that they must adapt their driving to preserve the tyres.

A second example of utilizing the measurement results is to determine the temperature of the internal inflation air, for example on the basis of charts or numerical models, and therefore to calculate the evolution of the inflation pressure while the tyre is running. In this way, it is possible to manage a compromise in performance between wear and endurance, for example.

The principle of the invention can be extrapolated to different types of tyres to those described here, notably of heavy-duty type, and more generally to tyres of which the radial thickness of the tread is sufficient to implement the invention.

The invention claimed is:

1. A system for measuring a temperature inside a rubber compound of a tire when the tire is running, the system comprising:

at least one sensor fitted with a microprocessor, radio transmission means, a temperature measuring probe and power supply means, the sensor being inserted in an area of the tire originating from a manufacturing process, the area being identified depending on predefined selection criteria, the sensor being embedded in a hermetically sealed volume formed inside the rubber compound of the area of the tire originating from the manufacturing process; and means for keeping the sensor in a fixed position while the tire is running, wherein the sensor is molded from a flexible material of which a dynamic shear stiffness modulus is less than or equal to one quarter of the dynamic shear stiffness modulus of the rubber compound of which the temperature is measured, the dynamic shear stiffness moduli being measured for a frequency equal to 10 Hz, a strain equal to 50% of the peak-to-peak strain amplitude, and a temperature equal to 60° C.

2. The system according to claim 1, wherein a layer of cold-vulcanized adhesive is laid between an outer surface of the sensor and the rubber compound of a cavity.

3. The system according to claim 2, wherein the layer of adhesive is a lubricant.

4. The system according to claim 1, wherein an outer surface of the sensor is grooved.

5. The system according to claim 1, wherein the sensor occupies a cylindrical volume of which a length of the cylinder is less than or equal to 60 mm, and wherein a diameter of the cylinder is less than or equal to 25 mm.

6. The system according to claim 5, wherein the sensor of cylindrical geometry is received in a cylindrical cavity inside the rubber compound in the area of which the diameter of the cylindrical cavity is less than or equal to that of the sensor.

7. The system according to claim 1, wherein the cavity containing the sensor is closed by a stopper made of the same rubber compound as that containing the sensor.

8. The system according to claim 1, wherein the sensor comprises an electronic circuit board having a thermocouple, a microprocessor, a radio transmitter and a battery, the electronic circuit board being coated in an encapsulating resin.

9. The system according to claim 1, wherein the sensor comprises an activation wire connecting two electrodes of the sensor.

10. The system according to claim 1, wherein the tire contains an identification tag.

11. The system according to claim 10, wherein the sensor is fitted with an active electronic module for measuring and transferring physical parameters of the tire, and wherein the sensor includes:

(i) means for measuring different physical parameters at the temperature of the tire;

(ii) means for reading a tag of the tire; and (iii) a data transmission module for transmitting the physical data received from the sensor to a remote receiver.

\* \* \* \* \*